US010393929B1

(12) United States Patent
Bikumandla

(10) Patent No.: US 10,393,929 B1
(45) Date of Patent: Aug. 27, 2019

(54) SYSTEMS AND METHODS FOR A PROJECTOR SYSTEM WITH MULTIPLE DIFFRACTIVE OPTICAL ELEMENTS

(71) Applicant: FACEBOOK TECHNOLOGIES, LLC, Menlo Park, CA (US)

(72) Inventor: Manoj Bikumandla, Union City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 77 days.

(21) Appl. No.: 15/827,548

(22) Filed: Nov. 30, 2017

(51) Int. Cl.
*G02B 5/18* (2006.01)
*G02B 27/42* (2006.01)

(52) U.S. Cl.
CPC ......... *G02B 5/1823* (2013.01); *G02B 5/1842* (2013.01); *G02B 27/4227* (2013.01)

(58) Field of Classification Search
CPC . G02B 5/1823; G02B 5/1842; G02B 27/4227
USPC ........................................................ 359/290
See application file for complete search history.

(56) References Cited

U.S. PATENT DOCUMENTS

| | | |
|---|---|---|
| 5,258,862 A | 11/1993 | Harris |
| 5,335,108 A | 8/1994 | Harris |
| 7,099,528 B2 | 8/2006 | Benner et al. |
| 7,443,587 B2 | 10/2008 | Dickson et al. |
| 7,804,646 B2 | 9/2010 | Chen et al. |
| 8,335,034 B2 | 12/2012 | Bernet et al. |
| 9,239,467 B2 | 1/2016 | Shpunt et al. |
| 9,250,373 B2 | 2/2016 | Kubota |
| 2002/0015230 A1 | 2/2002 | Pilossof et al. |
| 2014/0016102 A1 | 1/2014 | Chen et al. |
| 2017/0168301 A1 | 6/2017 | Chen et al. |

*Primary Examiner* — Wen Huang
(74) *Attorney, Agent, or Firm* — FisherBroyles, LLP

(57) ABSTRACT

The disclosed system may include (1) a light source, (2) a first diffractive optical element (DOE), optically coupled with the light source, that produces a first diffracted light pattern, (3) at least one additional DOE, optically coupled with the light source in series with the first DOE, that produces at least one additional diffracted light pattern, (4) an actuator that moves, in response to a first actuator control signal, the first DOE in a first plane perpendicular to an optical axis of the system, and (5) a lens, optically coupled with the first DOE and the at least one additional DOE, that projects structured light onto a local area based on the first diffracted light pattern and the at least one additional diffracted light pattern. Various other systems and methods are also disclosed.

20 Claims, 10 Drawing Sheets

SYSTEMS AND METHODS FOR A PROJECTOR SYSTEM WITH MULTIPLE DIFFRACTIVE OPTICAL ELEMENTS

BACKGROUND

Some imaging systems (e.g., camera systems employed in conjunction with virtual reality (VR) or augmented reality (AR) devices) project structured light (e.g., predetermined patterns, such as lines, spots, and so on), whether in the visible spectrum, infrared (IR) spectrum, near-infrared (NIR) spectrum, or another wavelength band, into a local area or environment. An imaging subsystem or device may then capture images of the reflections of the projected structured light from the local area. A control system may then process the images to "map" the local area, such as by determining the distance from the imaging subsystem to each lighted portion of the local area based on the geometry of the reflected light patterns perceived via the imaging subsystem.

In such imaging systems, a diffractive optical element (DOE) may be employed to generate the predetermined patterns that are projected into the local area. Generally, a DOE may be constructed of glass, polymer, or another material that is etched, scored, or otherwise altered so that light passing through the DOE will result in the generation of the structured light pattern. Generally, the higher the resolution of the structured light being projected (e.g., the higher number of identifiable features in the pattern, the closer the features are to each other in the pattern, and so on), the higher the resolution of the resulting map of the local area. Consequently, to provide such structured light, the pattern provided by the DOE is typically of a corresponding high resolution, which may be relatively expensive compared to a DOE providing a simpler, lower-resolution pattern. Additionally, systems using such DOEs may each be limited to projecting a single structured light pattern corresponding to the particular DOE surface features.

SUMMARY

As will be described in greater detail below, the instant disclosure describes systems and methods for a projector system with multiple DOEs. In one example, a system may include (1) a light source, (2) a first DOE, optically coupled with the light source, that produces a first diffracted light pattern, (3) at least one additional DOE, optically coupled with the light source in series with the first DOE, that produces at least one additional diffracted light pattern, (4) a first actuator that moves, in response to a first actuator control signal, the first DOE in a first plane perpendicular to an optical axis of the system, and (5) a first lens, optically coupled with the first DOE and the at least one additional DOE, that projects structured light onto a local area based on the first diffracted light pattern and the at least one additional diffracted light pattern. In some examples, the system may also include a second actuator that moves, in response to a second actuator control signal, one of the at least one additional DOE in a second plane parallel to the first plane.

In some embodiments, the first actuator may translate the first DOE along a first axis in the first plane. Also, in some examples, the first actuator may translate the first DOE along a first axis in the first plane and along a second axis in the first plane orthogonal to the first axis. In some examples, the first actuator may rotate the first DOE in the first plane. Moreover, in some embodiments, the first actuator may rotate the first DOE about the optical axis defined by the system. In some embodiments, the first actuator may include a microelectromechanical system (MEMS) actuator.

In some examples, one of the first diffracted light pattern or the at least one additional diffracted light pattern may include at least one pattern dimension larger than a corresponding pattern dimension of another of the first diffracted light pattern or the at least one additional diffracted light pattern.

In some embodiments, the light source may include a vertical-cavity surface-emitting laser (VCSEL).

In some examples, the system may also include a prism optically coupling the light source to the first DOE and the at least one additional DOE. In such embodiments, the light source may include an edge-emitting laser (EEL).

In at least some embodiments, the system may include a second lens optically coupling the light source to the first DOE and the at least one additional DOE.

In some examples, the system may further include an imaging device that captures, in response to a capture control signal, an image of a reflection of the structured light from the local area.

Additionally, in some embodiments, the system may also include a control system that generates the first actuator control signal and the capture control signal to cause the first actuator to move the first DOE to a first position and to move the first DOE to a second position, and to cause the imaging device to capture a first image of the reflection of the structured light while the first DOE is in the first position and to capture a second image of the reflection of the structured light while the first DOE is in the second position.

In some examples, the system may further include a control system that generates the first actuator control signal and the capture control signal to cause the first actuator to move the first DOE to a first position and to move the first DOE to a second position, and to cause the imaging device to capture a single image of the reflection of the structured light while the first DOE is in the first position and while the first DOE is in the second position.

In at least some examples, the system may also include a control system that generates the first actuator control signal and the capture control signal to cause the first actuator to move the first DOE among a plurality of positions in a repeating pattern, and to cause the imaging device to capture a single image of the reflection of the structured light while the first DOE is moving among the plurality of positions.

In some embodiments, the system may further include (1) a second actuator that moves, in response to a second actuator control signal, one of the at least one additional DOE in a second plane perpendicular to the optical axis defined by the system, and (2) a control system that generates the first actuator control signal, the second actuator control signal, and the capture control signal to cause the first actuator to move the first DOE among a first plurality of positions in a first repeating pattern, to cause the second actuator to move the one of the at least one additional DOE among a second plurality of positions in a second repeating pattern, and to cause the imaging device to capture a single image of the reflection of the structured light while the first DOE is moving among the first plurality of positions and the one of the at least one additional DOE is moving among the second plurality of positions.

In one example, a light projector system may include (1) a light source, (2) a first DOE, optically coupled with the light source, that produces a first diffracted light pattern, (3) at least one additional DOE, optically coupled to the light source in series with the first DOE, that produces at least one additional diffracted light pattern, (4) an actuator that moves, in response to an actuator control signal, the first DOE in a first plane perpendicular to an optical axis of the system, (5) a first lens, optically coupled with the first DOE and the at least one additional DOE, that projects structured light onto a local area based on the first diffracted light pattern and the at least one additional diffracted light pattern, (6) an imaging device that captures, in response to a capture control signal, at least one image of a reflection of the structured light from the local area in response, (7) a control system that generates the actuator control signal and the capture control signal to generate a map of the local area using the at least one image, and (8) a display system that displays a virtual environment based on the map of the local area.

In one example, a method may include (1) moving, to a first position in a plane perpendicular to an optical axis using an actuator, a first DOE optically coupled with a light source in series with at least one additional DOE to project a first structured light pattern in a local area, (2) moving, to a second position in the plane using the actuator, the first DOE to project a second structured light pattern in the local area, and (3) capturing, using an imaging device, a reflection of the first structured light pattern and a reflection of the second structured light pattern from the local area. In some embodiments, the method may further include mapping the local area based on the capturing of the reflection of the first structured light pattern and the reflection of the second structured light pattern.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
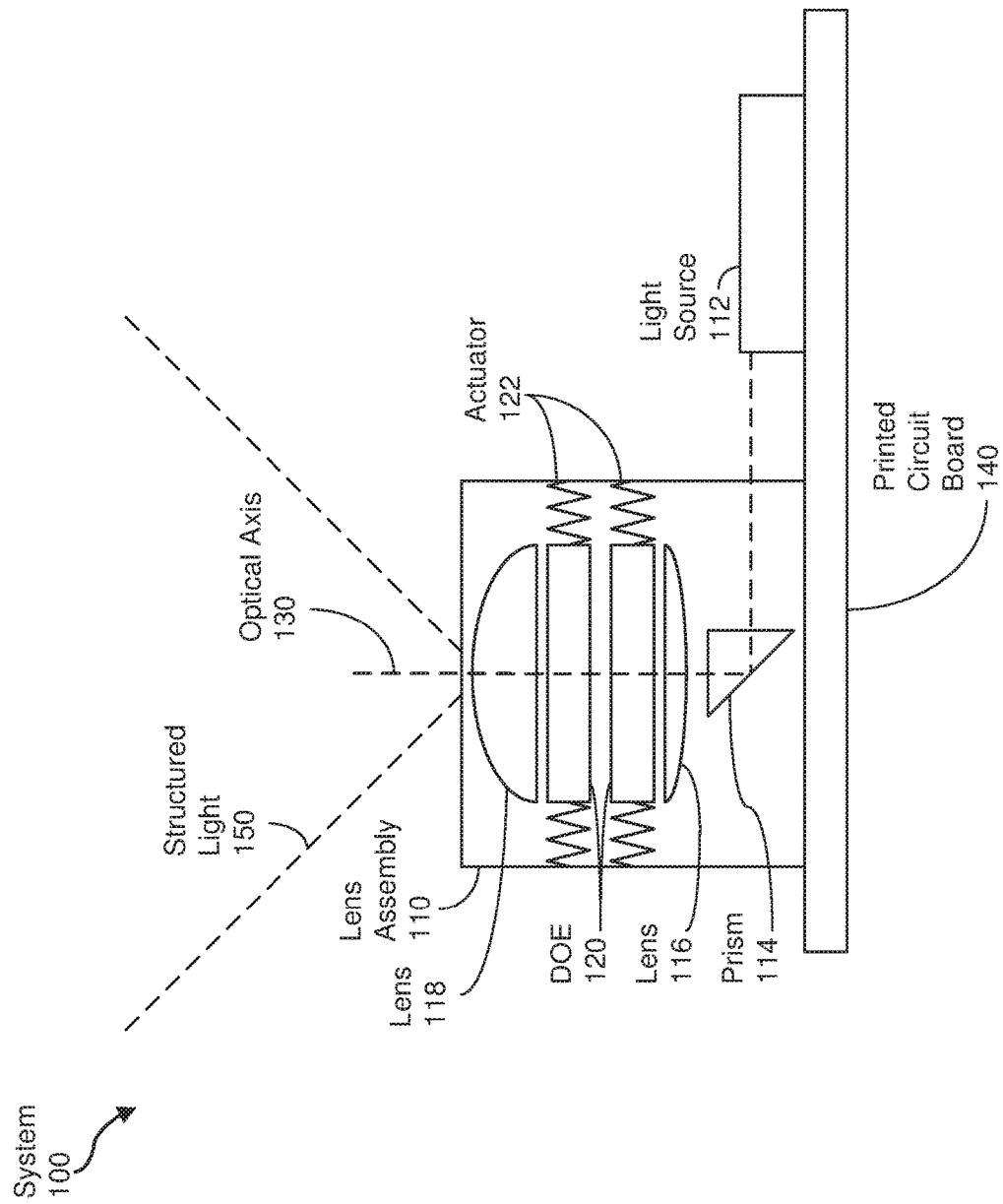
FIG. 1 is a block diagram of an example light projector system that includes an example lens assembly having multiple DOEs.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for a projector system with multiple DOEs. As will be explained in greater detail below, embodiments of the instant disclosure may include (1) a light source, (2) a first DOE, optically coupled with the light source, that produces a first diffracted light pattern, (3) at least one additional DOE, optically coupled with the light source in series with the first DOE, that produces at least one additional diffracted light pattern, (4) an actuator that moves, in response to an actuator control signal, the first DOE in a plane perpendicular to an optical axis of the system, and (5) a lens, optically coupled with the first DOE and the at least one additional DOE, that projects structured light onto a local area based on the first diffracted light pattern and the at least one additional diffracted light pattern. By employing the actuator to move the first DOE, two or more different high-resolution patterns of structured light may be projected into the local area in some embodiments by employing at least two DOEs, each of which may individually provide a comparatively lower-resolution pattern. In some examples described in greater detail below, the resulting high-resolution structured light pattern may be used to generate a correspondingly high-resolution map of the local area.

Figure 2:
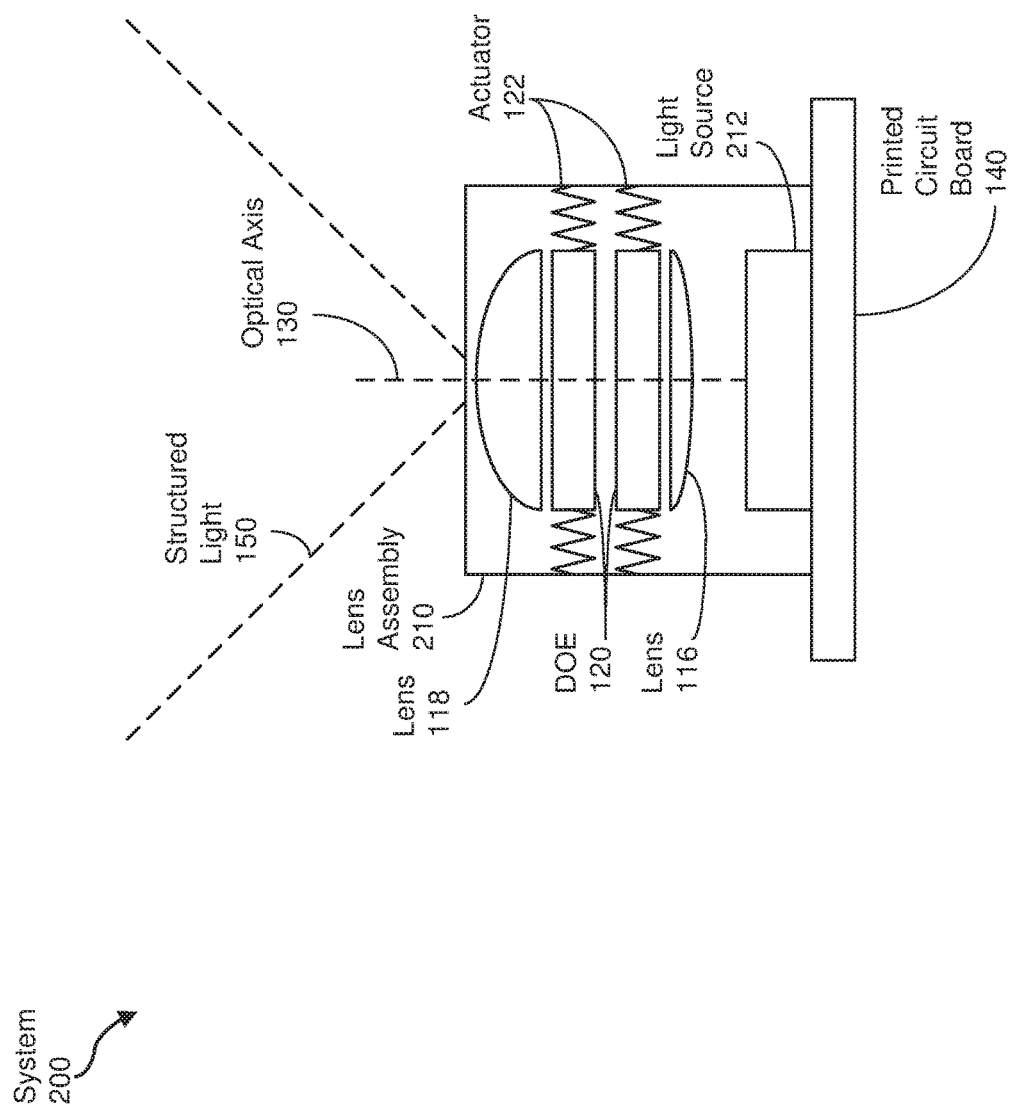
FIG. 2 is a block diagram of another example light projector system that includes another example lens assembly having multiple DOEs.
Figure 5:
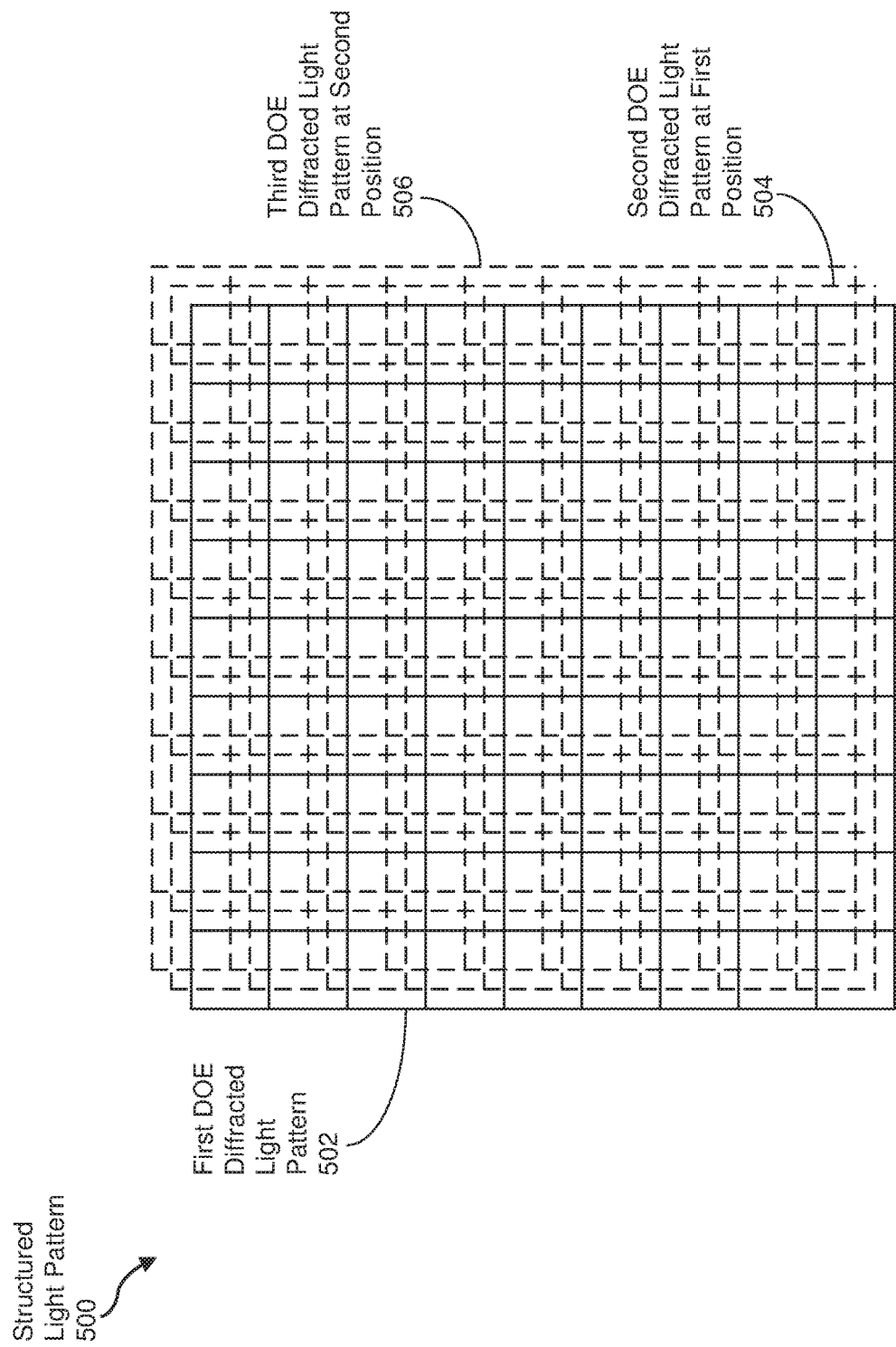
FIG. 5 is an example structured light pattern that may be produced using an example DOE that may be translated in an x-y plane.
Figure 6:
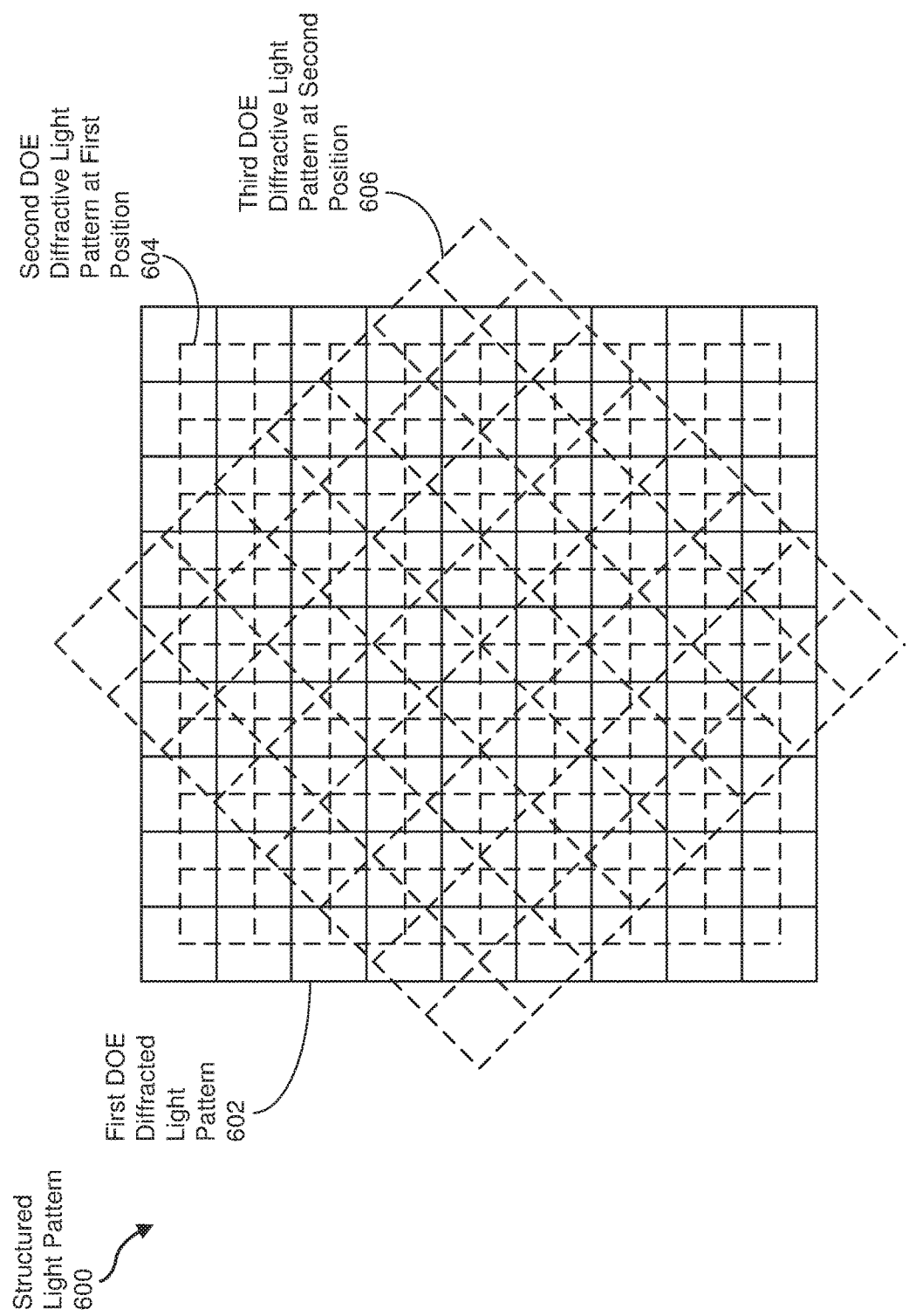
FIG. 6 is an example structured light pattern that may be produced using an example DOE that may be rotated in an x-y plane.
Figure 7:
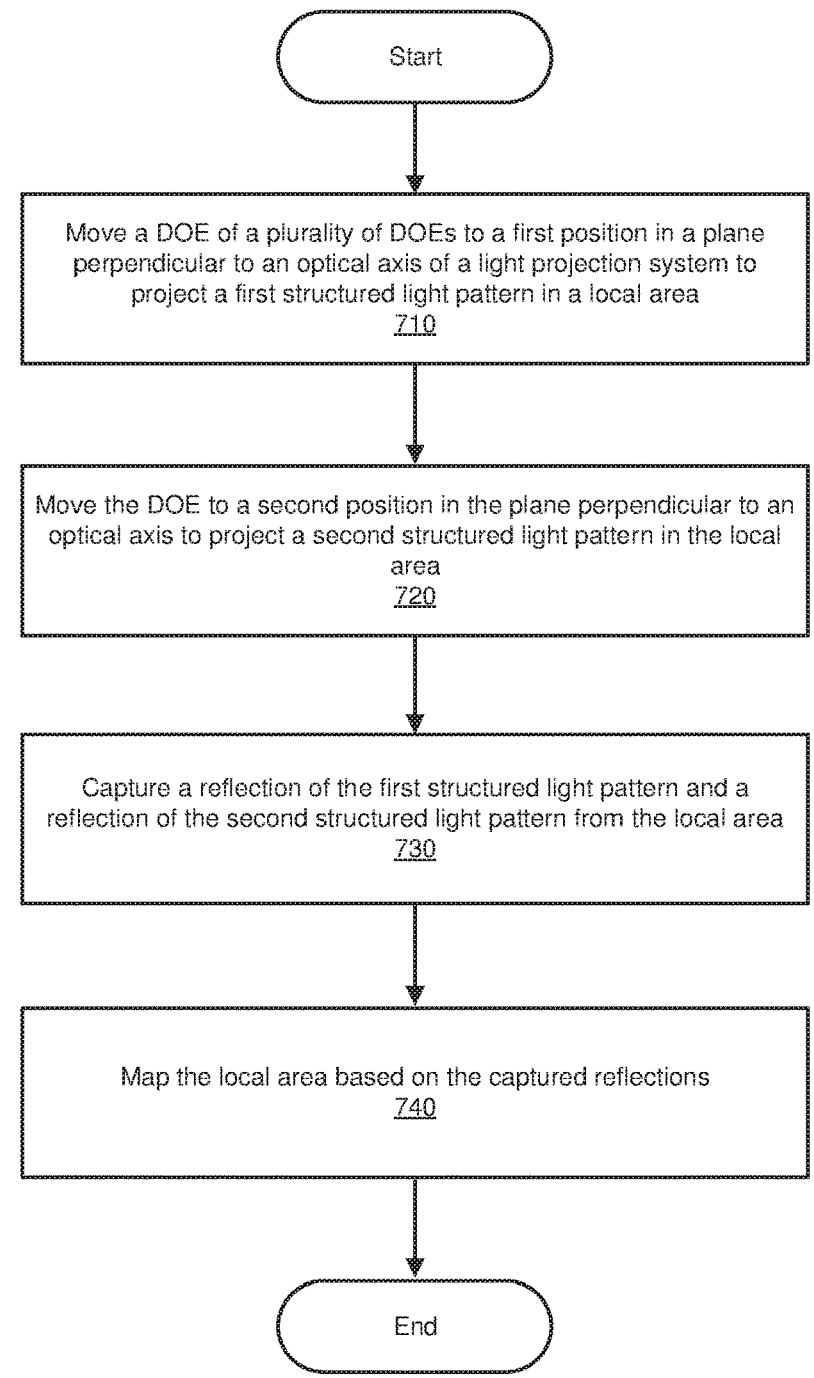
FIG. 7 is a flow diagram of an example method of operating the example systems of FIGS. 1 and 2.

The following will provide, with reference to FIGS. 1-10, detailed descriptions of example systems and methods for a projector system with multiple DOEs. More specifically, a discussion of example light projector systems including example lens assemblies having multiple DOEs is presented in conjunction with FIGS. 1 and 2. A description of the example lens assemblies of FIGS. 1 and 2 is presented in connection with FIG. 3. In association with FIG. 4, the physical structure of example DOEs that may be employed in the example systems of FIGS. 1 and 2 are described. Example structured light patterns that may be generated based on movement of a DOE are discussed in connection with FIGS. 5 and 6. Methods of operation using the example systems of FIGS. 1 and 2, as depicted in FIG. 7, are presented below. In conjunction with FIGS. 8-10, examples of a head-mounted display system including an example light projector system having multiple DOEs are discussed.

FIG. 1 is a block diagram of an example light projector system 100 employing a lens assembly 110 having multiple diffractive optical elements (DOEs) 120. In some examples, system 100 may be a light projector system that is included in an imaging system for mapping or otherwise imaging a local area within which system 100 is located. As depicted in FIG. 1, lens assembly 110 and/or the components included therein (e.g., DOEs 120, lenses 116 and/or 118, as so on) may define an optical axis 130 along which light generally passes prior to projection of structured light 150 into the local area. While FIG. 1 depicts two DOEs 120, three or more DOEs may be used in other embodiments. Generally, each DOE 120 reshapes light it receives (e.g., from light source 112) into a pattern of structured light 150 (e.g., one or more lighted spots, lines, grids, and/or the like) to be projected onto a local area in which system 100 is located. In some embodiments, each DOE 120 may include a micro-structured surface that performs the reshaping of the light. In some examples, each DOE 120 may include glass, a polymer, or another material that passes at least some light. DOEs 120 may be scored, embossed, etched, injection-molded, or otherwise manufactured or processed to produce the micro-structured surface. Examples of DOEs 120 are described below in conjunction with FIG. 4.

In some embodiments, lens assembly 110 may include at least one actuator 122 coupled to a corresponding DOE 120. While FIG. 1 illustrates two actuators 122, each of which is connected to a separate DOE 120, in other examples, a single actuator 122 may be connected to one DOE 120, with one or more other DOEs 120 not connected to any actuator 122. In yet other embodiments, any number of DOEs 120 located in lens assembly 110 may or may not be connected to accompanying actuators 122. In some examples, actuator 122 may be any suitable actuator, such as a mechanical or electromechanical actuator, for moving corresponding DOE 120 with a high degree of precision. In some embodiments, actuator 122 may be an electromechanical actuator, such as a microelectromechanical system (MEMS) (e.g., a distributed electrostatic micro-actuator), a voice coil actuator (VCA), or another type of actuator that may move DOE 120 relative to optical axis 130.

In some examples, actuators 122 may move corresponding DOEs 120 within a plane perpendicular to optical axis 130 of lens assembly 110. In some embodiments, each actuator 122 may move a corresponding DOE 120 within a plane parallel to an imaging plane of an imaging device (not depicted in FIG. 1) that captures a reflection of structured light 150 from the local area. Actuator 122, in some examples, may translate and/or rotate its corresponding DOE 120 within a particular plane (e.g., a plane perpendicular to optical axis 130). Examples of potential movement of DOE 120 imparted by associated actuator 122 are discussed below in connection with FIG. 3. Also, in some embodiments, actuator 122 may include, or communicate with, one or more location sensors that provide feedback indicating the current location of associated DOE 120 so that DOE 120 may be positioned as intended (e.g., by a control system tasked with moving DOE 120 using corresponding actuator 122).

Lens assembly 110 may also include one or more lenses 116 and 118 (e.g., aligned along optical axis 130) for passing light to and from one or more DOEs 120. For example, a lens 118 may receive a structured light pattern from DOEs 120 and project structured light 150 into the local area based on the received structured light pattern. In an embodiment, lens 118 may receive a collimated structured light pattern from DOEs 120 and project the pattern as structured light 150 using a convergent or divergent beam. Also, in some embodiments, lens 116 may receive light from light source 112 (e.g., collimated light) and produce a broader collimated light beam (e.g., aligned with optical axis 130) for DOEs 120. While FIG. 1 depicts lenses 116 and 118 as single lenses, lens 116 and/or lens 118 may each include one or more lenses. Also, in some examples, lens 116 and/or lens 118 may not be employed in lens assembly 110.

Also shown in FIG. 1 is a prism 114 for receiving light from light source 112 and redirecting the received light toward lens 116 and/or DOEs 120 (e.g., along optical axis 130). As shown in FIG. 1, prism 114 may redirect the received light approximately 90 degrees, although other configurations are possible. In other examples, other types of optical components (e.g., one or more mirrors) may be employed to redirect light from light source 112 for alignment along optical axis 130.

Also illustrated in FIG. 1 is printed circuit board (PCB) 140, upon which light source 112 and/or lens assembly 110 may be mounted. In some examples, PCB 140 may provide electrical power and/or control signals (e.g., one or more actuator control signals for actuators 122, one or more light source control signals for light source 112, and so on) for lens assembly 110, light source 112, and/or other components of system 100. In some embodiments, these control signals may be generated by electronic circuitry, such as a control system (e.g., microprocessor, microcontroller, and/or other circuitry) for controlling those components of system 100. In some examples, light source 112 may generate infrared (IR) light, near-infrared (NIR) light, and/or one or more bands of visible light. Also in some embodiments, light source 112 may be a laser light source, although other embodiments may employ other types of light sources 112. In some examples, light source 112 may be an edge-emitting laser (EEL) mounted to PCB 140, such that laser light emitted from light source 112 may be directed along a path substantially parallel to PCB 140 toward prism 114.

FIG. 2 is a block diagram of an example light projector system 200 that includes a lens assembly 210 similar in some respects to lens assembly 110 of FIG. 1. In some examples, lens assembly 210 may include lenses 116 and/or 118, one or more DOEs 120, and one or more actuators 122, as described above. In some embodiments, lens assembly 210 may not include prism 114 due to a difference in the light source being employed. For example, a light source 212 may generate light that is directed along optical axis 130 toward lens 116 and/or DOEs 120. In an embodiment, light source 212 may be a vertical-cavity surface-emitting laser (VCSEL) that is mounted to PCB 140 and emits laser light (e.g., IR, NIR, and/or visible light) along optical axis 130. However, other types of light-emitting devices may serve as light source 212 in other examples. Also, while some embodiments, such as those represented in FIG. 2, may include light source 212 within lens assembly 210, other examples may structure system 200 so that light source 212 resides outside lens assembly 210 but remains aligned with optical axis 130.

Figure 3:
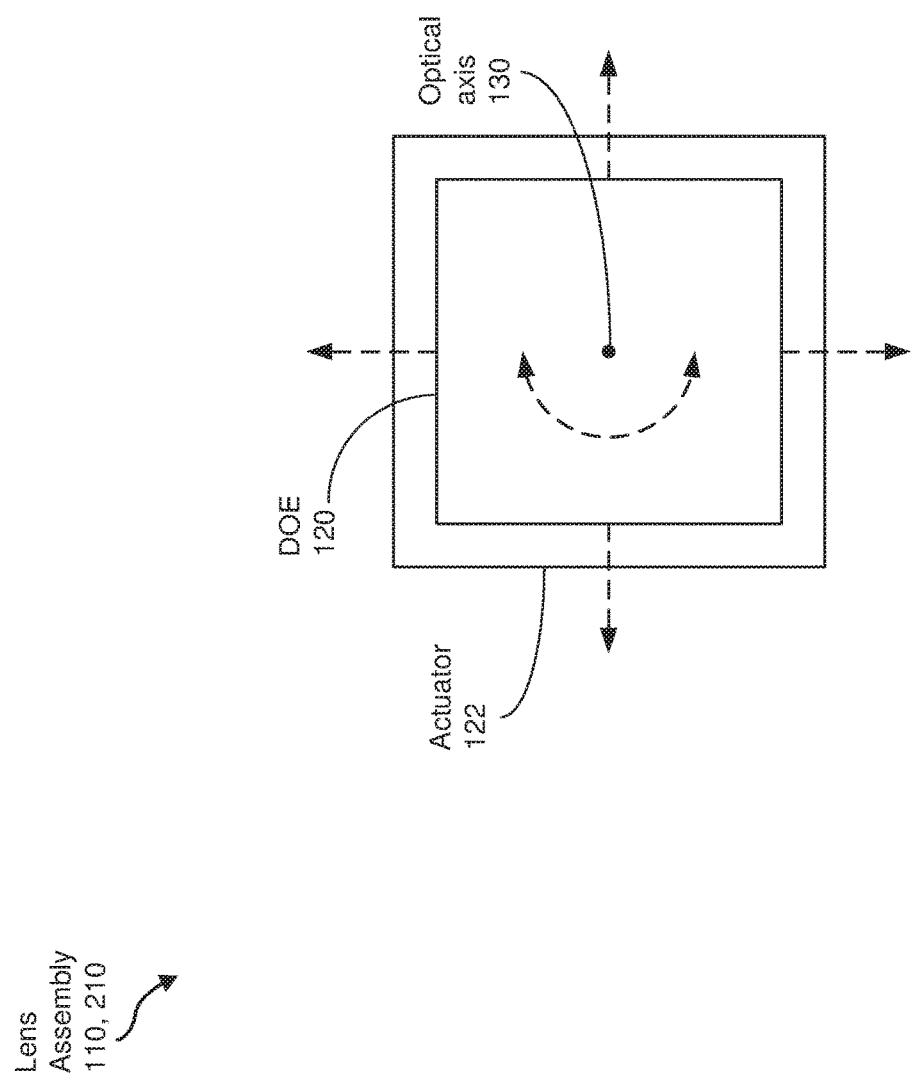
FIG. 3 is a top view of an example DOE and associated example actuator employable in the example lens assemblies of FIGS. 1 and 2.

FIG. 3 is a top view of DOE 120 and associated actuator 122, as employed in lens assemblies 110 and/or 210 of FIGS. 1 and 2 in some examples. As indicated above, in some embodiments, actuator 122 may move corresponding DOE 120 within a plane perpendicular to an optical axis 130 of lens assembly 110. For example, actuator 122 may translate its associated DOE 120 along an axis (e.g., an x-axis) within the plane perpendicular to optical axis 130. In addition, actuator 122 may translate its DOE 120 along that axis, as well as along another axis (e.g., a y-axis) perpendicular to the first axis, thus allowing actuator 122 to translate DOE 120 about an x-y plane within some range of optical axis 130. In some embodiments, actuator 122 may additionally or alternatively rotate DOE 120 about optical axis 130. In some other examples, the plane perpendicular to optical axis 130 within which actuator 122 may move DOE 120 may be parallel to an imaging plane of an imaging device (not depicted in FIGS. 1-3).

Figure 4:
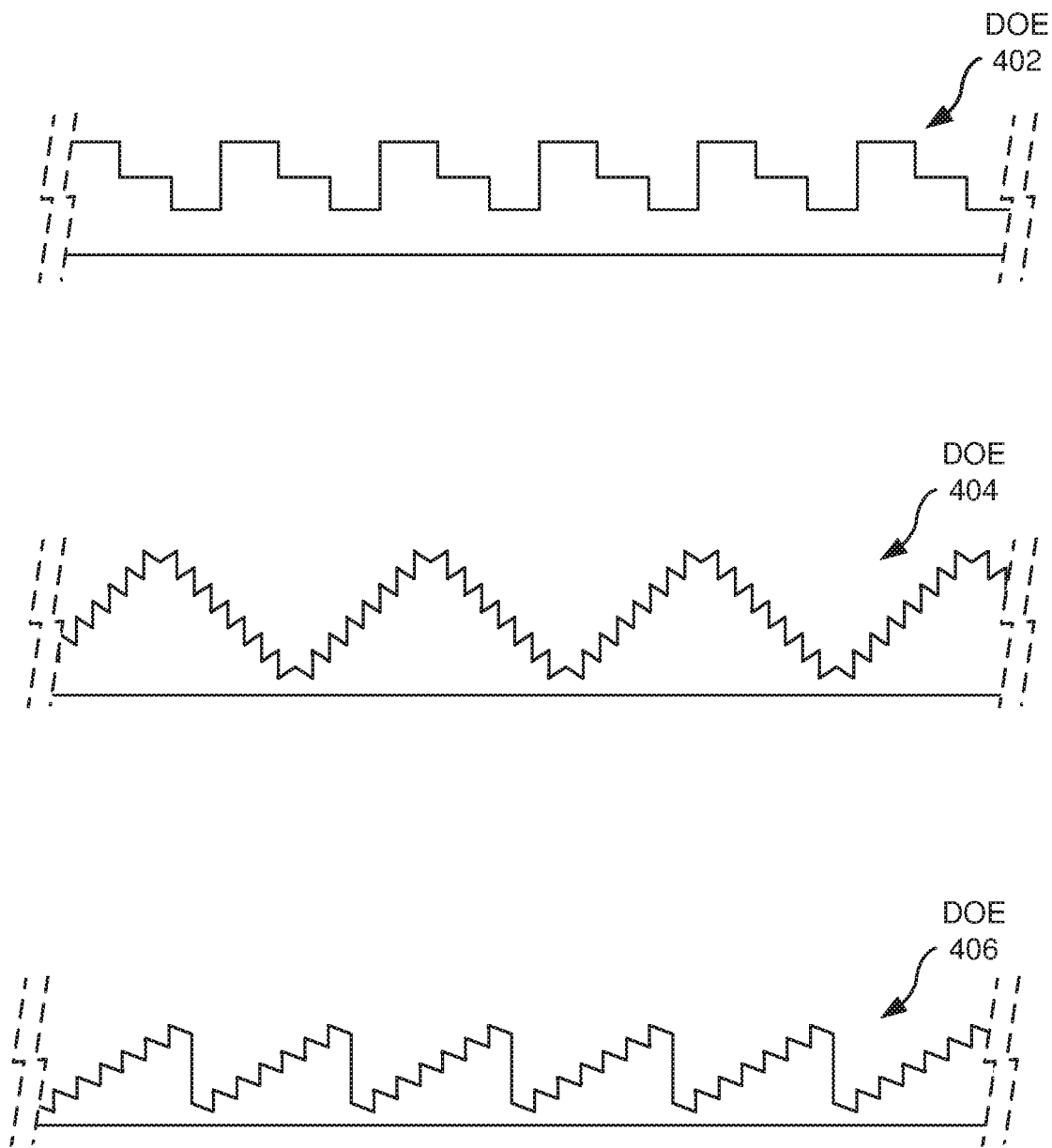
FIG. 4 includes partial cross-sectional views of example DOEs employable in the example lens assemblies of FIGS. 1 and 2.

FIG. 4 provides partial cross-sectional views of three different example DOEs (a first DOE 402, a second DOE 404, and a third DOE 406) that may serve as one or more DOEs 120 of lens assembly 110 and/or 210. First DOE 402 includes, for example, a horizontal step pattern. In some examples, the steps may have a top surface parallel to a bottom surface of DOE 402. The width of the steps may be the same or different, and the height difference between adjacent steps may also be the same or different. The horizontal step pattern of DOE 402 may be the same across the entire structure or may have regions that are different (e.g., including a different step pattern). Second DOE 404 includes, for example, a series of pyramidal structures having steps on either side. These steps may be angled with respect to the bottom surface of DOE 404. The angles may be in a range from approximately 15 degrees to approximately 75 degrees and may be uniform or nonuniform, such that some of the steps may have different angled top surfaces. Third DOE 406 includes, for example, a structure with a plurality of steps (angled as shown, but parallel to the bottom surface of DOE 406 in other embodiments) that ascend to a highest step and then drop (rather than gradually descend, as in DOE 404) to the lowest step in the pattern. In some embodiments, the depicted cross-sections of DOEs 402, 404, and 406 may extend the full length of DOE 120. Other embodiments may include different cross-sectional configurations, such that the pattern varies in x- and y-directions of the top surface of DOE 120. In other embodiments, DOE 120 may be provided by diffraction gratings having different spacings therebetween. In some examples, the motion imparted by actuator 122 on DOE 120, whether by translating and/or rotating, may be in a plane parallel to the top and/or bottom surface of DOE 120 (e.g., DOEs 402, 404, and/or 406).

In at least some examples, use of one or more DOEs 120 in conjunction with one or more actuators 122, as described above, may provide the ability to generate a multitude of different patterns of structured light 150 for projection into the local area. For example, FIG. 5 depicts an example structured light pattern 500 projected by system 100 and/or 200 into the local area based on diffracted light patterns provided by multiple DOEs 120 (e.g., a first DOE and a second DOE), and based on translation imparted by actuator 122 on the second DOE in an x-y plane. As shown in FIG. 5, structured light pattern 500 includes a first DOE diffracted light pattern 502 generated by the first DOE, a second DOE diffracted light pattern 504 projected by the second DOE in a first position, and a third DOE diffracted light pattern 506 projected by the second DOE in a second position translated in both x- and y-directions from the first position. Consequently, translating the second DOE between the first and second position may result in the generation of a more complex, and thus higher-resolution, structured light pattern 500 compared to what is possible with a single DOE 120.

FIG. 6 depicts an example structured light pattern 600 projected by system 100 and/or 200 into the local area based on diffracted light patterns provided by multiple DOEs 120 (e.g., a first DOE and a second DOE), and based on rotation imparted by actuator 122 on the second DOE about optical axis 130. As illustrated in FIG. 6, structured light pattern 600 includes a first DOE diffracted light pattern 602 generated by the first DOE, a second DOE diffracted light pattern 604 projected by the second DOE in a first position, and a third DOE diffracted light pattern 606 projected by the second DOE in a second position rotated about optical axis 130 from the first position. As a result of this rotation, rotating the second DOE between the first and second position may result in the generation of a more complex, and thus higher-resolution, structured light pattern 600 compared to what is possible with a single DOE 120.

In some examples, one DOE 120 may provide a larger or "coarser" diffracted light pattern (e.g., a pattern with larger spacing between lines, a pattern with broader lines, or the like) compared to a smaller or "finer" diffracted light pattern provided by a second DOE. In such examples, either or both of DOEs 120 may be moved (e.g., translated and/or rotated) by corresponding actuators 122.

In some embodiments, the use of actuator 122 to produce high-resolution structured light patterns (e.g., structured light patterns 400 and 500 of FIGS. 4 and 5) based on lower-resolution light patterns provided by separate DOEs 120 may facilitate the use of lower complexity and/or lower resolution, and thus relatively inexpensive, DOEs 120. While structured light patterns 500 and 600 of FIGS. 5 and 6 may be produced using structured light in a grid pattern provided by DOEs 120, other types of structured light (e.g., lines, spots, and so on) may be employed in other embodiments. Also, in some examples, actuator 122 may impart both translational and rotational motion on a corresponding DOE 120 to project an even greater number of high-resolution structured light patterns onto the local area. By increasing the resolution of the structured light patterns being projected, a resulting map of the local area based on the structured light patterns may be of a corresponding high resolution.

FIG. 7 is a flow diagram of an example method 700 of operating an imaging system (e.g., a system including a light projector system, such as systems 100 and/or 200). The steps shown in FIG. 7, as well as other methods described below, may be performed by any suitable computer-executable code and/or computing system, such as a control system that generates a light control signal for light source 112, a capture control signal for an imaging device, and one or more actuator control signals for one or more actuators 122. For example, the light control signal may cause light source 112 to emit light for lens assembly 110 to generate structured light 150. In some embodiments, the capture control signal may cause an imaging device to capture a reflection of structured light 150 from the local area. Moreover, in some examples, the capture control signal may indicate a timing of the capturing of the reflections. Also in some embodiments, the actuator control signal may control one of more aspects (e.g., timing, magnitude, direction, and/or the like) of an actuator 122 to move corresponding DOE 120 relative to optical axis 130. Each of multiple such actuators 122 may move a corresponding DOE 120 of one or more DOEs 120 in lens assembly 110 or 210.

In some embodiments, such a control system may generate the light control signal, the capture control signal, and/or the one or more actuator control signals to employ captured reflections of structured light (e.g., using an imaging device) for one or more purposes, such as to generate a map of a local area in which system 100 and/or 200 is located, as discussed herein. In some additional embodiments described in greater detail below, system 100 and/or 200 may include, or may be coupled with, a display system for displaying a virtual environment (e.g., to a user), wherein the virtual environment is based on the generated map. In some examples, each of the control signals may include multiple control signals to perform a particular function. Also, in some examples, each of the steps shown in FIG. 7 may represent an algorithm whose structure includes and/or is represented by multiple sub-steps.

In method 700, at step 710, a DOE (e.g., DOE 120) of a plurality of DOEs may be moved (e.g., translated and/or rotated) to a first position in a plane perpendicular to an optical axis (e.g., optical axis 130) of a light projection system (e.g., system 100 or 200) to project a first structured light pattern in a local area (see, e.g., FIGS. 1-6). At step 720, the DOE may be moved (e.g., translated and/or rotated) to a second position in the plane perpendicular to the optical axis to project a second structured light pattern in the local area. At both steps 710 and 720, in some examples, the structured light patterns may be generated from a combination of the individual diffracted light patterns from the plurality of DOEs, as described above. In other examples, multiple such DOEs may be moved (e.g., one at a time, simultaneously, concurrently, etc.).

Figure 8:
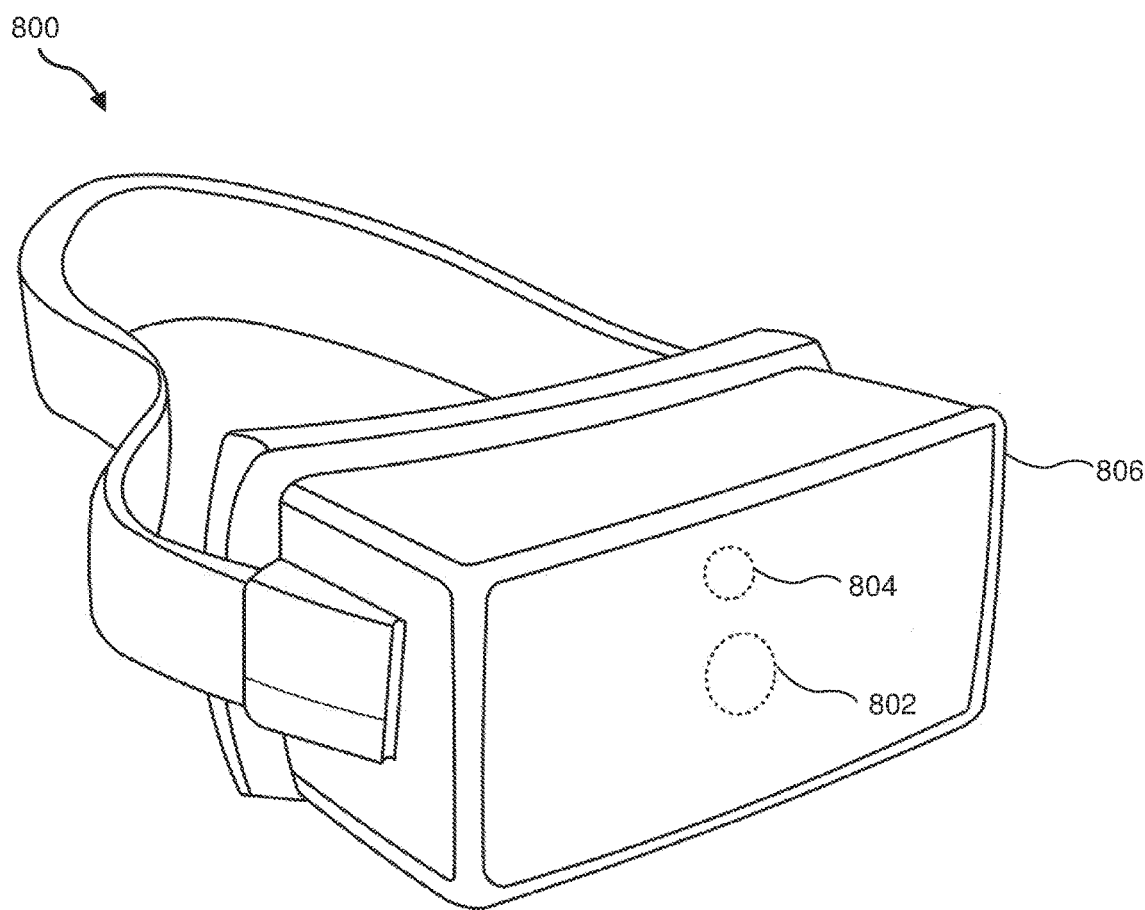
FIG. 8 is a perspective view of an example head-mounted display that may include the example systems of FIGS. 1 and 2.
Figure 9:
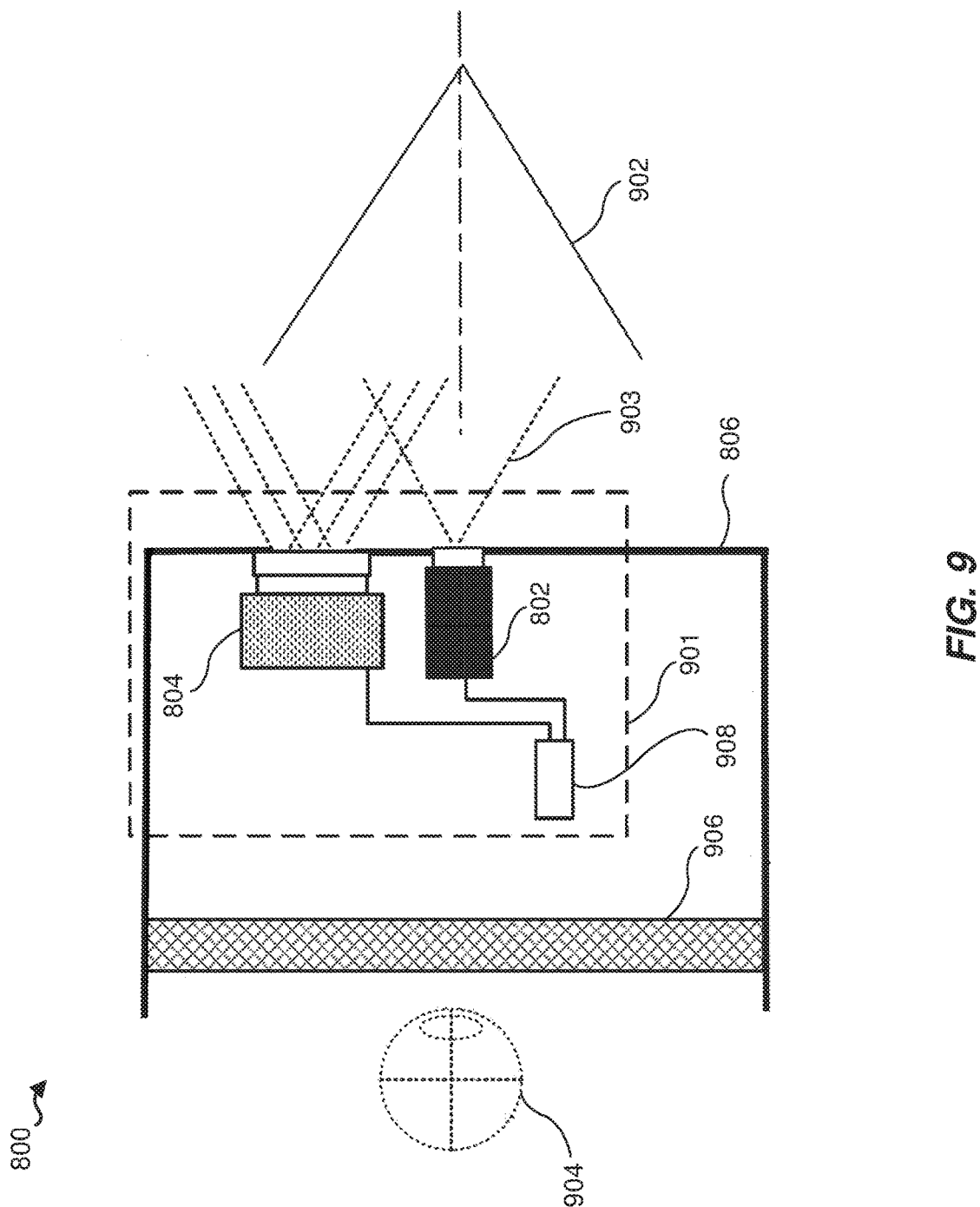
FIG. 9 is a cross-section of the example head-mounted display of FIG. 8.

At step 730, at least one reflection from the local area of the structured light patterns may be captured (e.g., using an imaging device such as imaging device 802 shown in FIGS. 8 and 9). In some examples, a single image may be captured for each reflection from the local area associated with a single position of each DOE being moved relative to the optical axis. For example, a first image may be captured when each of the DOEs are each located at some corresponding position, while a second, separate image may be captured when at least one of the DOEs being moved is located at a different position. As a result, in such examples, each captured image may employ a single structured light pattern (e.g., generated using the plurality of DOEs 120) projected onto the local area during a different period of time, such as for mapping the local area. The use of multiple DOEs in such a fashion may facilitate the ability to generate a different, high-resolution structured light pattern for each image capture operation than what is typically possible with a single, stationary DOE. Moreover, the use of multiple DOEs may allow each DOE to be relatively simple (e.g., comparatively lower-resolution) in structure while providing an overall high-resolution structured light pattern.

In some embodiments, a single image may be captured for a reflection from the local area associated with multiple positions (e.g., the first position and the second position of method 700) of one or more DOEs relative to the optical axis (e.g., optical axis 130). For example, an aperture time during which the imaging device is capturing reflections from the local area may span a time during which the one or more DOEs are moved among two or more positions. Consequently, images of even more complicated (e.g., higher-resolution) structured light patterns may be captured than what may be possible with a plurality of DOEs that are movable, but are each placed in a particular position during an image capture operation.

In some embodiments, presuming the projection of structured light is being employed for mapping purposes, in method 700, at step 740, the local area from which the reflections are captured may be mapped (e.g., by a control system, as discussed above) based on the one or more captured reflections. In some examples, each of one or more of the DOEs (e.g., DOE 120) may be moved (e.g., translated and/or rotated) by a corresponding actuator (e.g., actuator 122) among two or more positions repeatedly (e.g., periodically), during which one or more images of the reflections of the structured light patterns from the local area may be captured. Consequently, any number of different high-resolution structured light patterns may be projected in rapid succession, the reflections of which may be captured in a repetitive manner. As a result, changes in the local area (e.g., changes in objects moving within the local area, changes in the location and/or orientation of system 100 and/or 200 within the local area, and so on) may be detected (e.g., mapped) quickly as they occur based on changes in the images of the reflections being captured.

In some example embodiments, a display system, such as that described below, may be communicatively coupled with an imaging system that includes embodiments of the light projector systems (e.g., system 100 or 200) so that the display system may display a virtual environment based on one or more maps of the local area, as described above.

FIG. 8 is a perspective view of an example head-mounted display 800 that may include a structured light projector system (e.g., system 100 and/or 200 of FIGS. 1 and 2). In an example, an imaging device 802 or system that incorporates a depth camera assembly or system (e.g., system 100 or 200, including lens assembly 110 or 210) may be included within head-mounted display 800. As shown in FIG. 8, head-mounted display 800 may include a front rigid body 806 through which an aperture (included within imaging device 802) may receive light. In some such examples, imaging device 802 may operate within a local area imaging assembly, which may be included within head-mounted display 800, as illustrated in FIG. 8. In these examples, as will be discussed in greater detail in connection with FIG. 9, the local area imaging assembly may include an illumination source 804 (e.g., system 100 or 200) which may emit light through front rigid body 806 of head-mounted display 800.

FIG. 9 represents a cross section of front rigid body 806 of head-mounted display 800. As shown in FIG. 9, head-mounted display 800 may include a local area imaging assembly 901 (e.g., including system 100 or 200). In some examples, local area imaging assembly 901 may be a device assembly configured to capture image data by way of received light 903 that is utilized in determining, mapping, and/or tracking position, orientation, and/or movement of objects within an area, such as local area 902 (e.g., an area surrounding head-mounted display 800). In some examples, local area imaging assembly 901 may include (1) imaging device 802 and (2) illumination source 804 configured to emit light (i.e., a carrier signal) into local area 902.

In some embodiments, local area imaging assembly 901 may determine depth and/or surface information for objects within local area 902 in a variety of ways. For example, local area imaging assembly 901 may be utilized in a simultaneous localization and mapping (SLAM) tracking system to identify and/or map features of local area 902 and/or to identify a location, orientation, and/or movement of head-mounted display 800 and/or other objects (e.g., hand-held controllers, users, etc.) in local area 902. In some examples, illumination source 804 may emit a structured light pattern (e.g., a symmetric and/or quasi-random dot pattern, a grid pattern, horizontal bars, etc.) into local area 902. In these examples, local area imaging assembly 901 may determine the depth and/or surface information based on triangulation or perceived deformation of the emitted pattern. In one embodiment, local area imaging assembly 901 may capture time-of-flight (TOF) information describing the time required for light emitted from illumination source 804 to be reflected from one or more objects in local area 902 back to imaging device 802. In this embodiment, local area imaging assembly 901 may determine a distance between local area imaging assembly 901 and the objects based on the TOF information.

In some examples, information collected by local area imaging assembly 901 may be used as part of an image and/or video (e.g., an artificial reality image and/or video) displayed to a user wearing head-mounted display 800. In one example, shown in FIG. 9, the image and/or video may be displayed to a user (e.g., via an eye 904 of the user) via an electronic display 906. Electronic display 906 may represent a single electronic display or multiple electronic displays (e.g., a display for each eye of a user). Examples of electronic display 906 may include, without limitation, a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a projector, a cathode ray tube, an optical mixer, and/or some combination thereof. The local area imaging assembly 901 may also include an imaging controller 908 (e.g., the control system discussed above in conjunction with FIGS. 1-7) that is coupled to illumination source 804 and/or imaging device 802.

In at least one embodiment, a head-mounted display system including head-mounted display 800 may additionally or alternatively include controller tracking features (e.g., constellation tracking). For example, in addition to determining features of local area 902, local area imaging assembly 901 may track a position, orientation, and/or movement of one or more controller devices, such as hand-held controllers, that are utilized by a user for interacting with head-mounted display 800 and/or local area 902.

Figure 10:
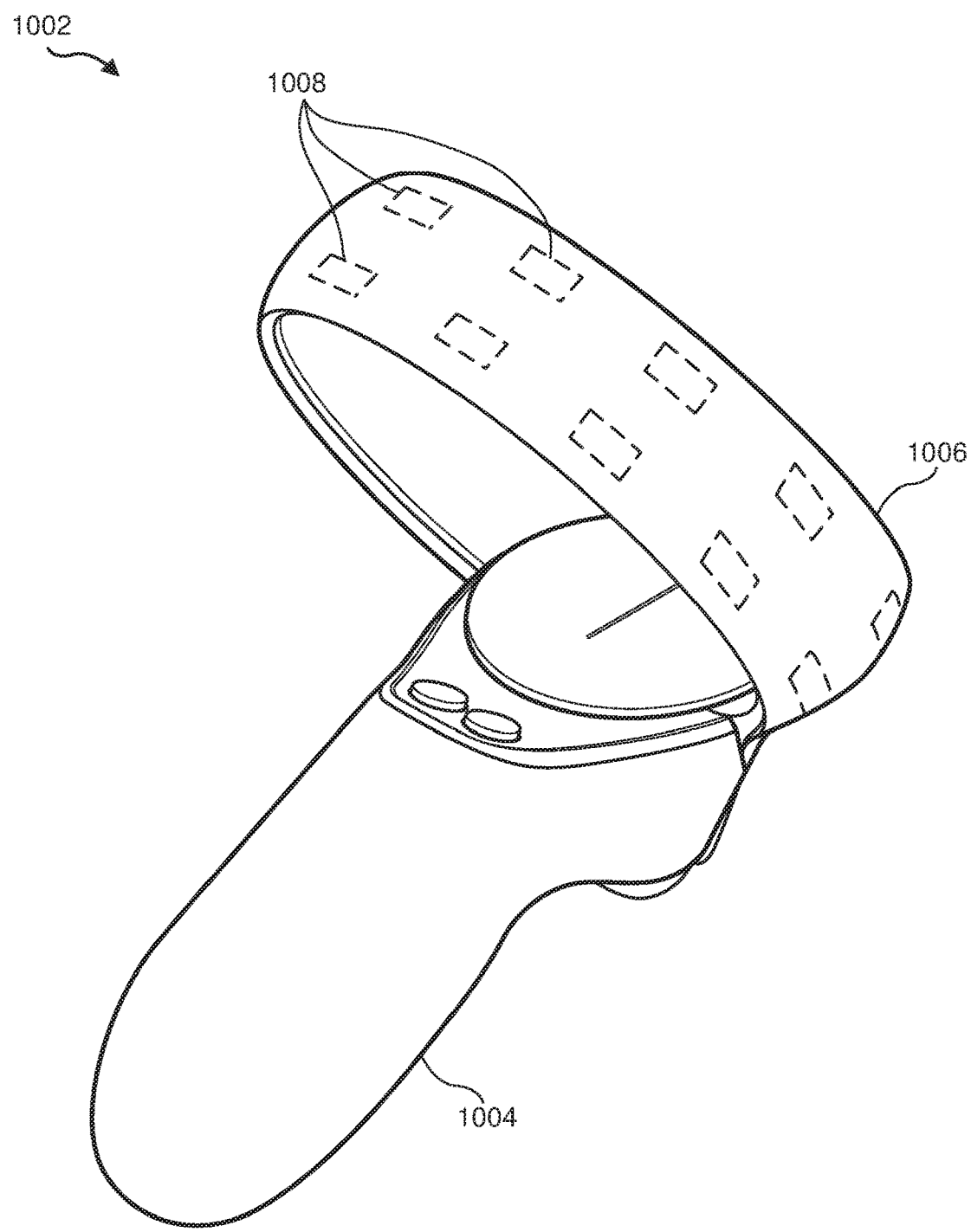
FIG. 10 is a perspective view of an example hand-held controller employable with the example head-mounted display of FIGS. 8 and 9.

FIG. 10 is a perspective view of an example hand-held controller 1002 that may be included in the head-mounted display system that includes head-mounted display 800 in accordance with some embodiments. The head-mounted-display system may include at least one hand-held controller 1002. For example, the head-mounted-display system may include two hand-held controllers 1002, with one hand-held controller 1002 for each of a user's right and left hands. Each hand-held controller 1002 may be communicatively coupled to head-mounted display 800 shown in FIGS. 8 and 9 and/or to a computing device (e.g., a personal computer, a console, etc.) communicatively coupled to head-mounted display 800. Hand-held controller 1002 may be communicatively coupled to head-mounted display 800 via any suitable wireless and/or wired connection.

As shown in FIG. 10, hand-held controller 1002 may include a grip 1004 sized to fit within a user's right or left hand. Hand-held controller 1002 may also include a tracking loop 1006 for tracking position, orientation, and/or movement of hand-held controller 1002 with respect to head-mounted display 800 and/or with respect to local area 902. For example, tracking loop 1006 may include an array of tracking lights 1008, such as tracking LEDs (e.g., infrared (IR) LEDs), that are used for motion and positional tracking purposes to provide 360-degree motion control while using the head-mounted display system. Controller 1002 may additionally or alternatively include tracking lights, such as tracking LEDs, on any other suitable portion of controller 1002. In at least one embodiment, imaging device 802 may receive light emitted by tracking lights 1008 on hand-held controller 1002, such as tracking LEDs on tracking loop 1006, and local area imaging assembly 901 may utilize the received light to determine location, orientation, and/or movement of hand-held controller 1002.

According to some embodiments, local area imaging assembly 901 shown in FIG. 9 may be utilized as part of a hybrid system for (1) SLAM imaging to locate, map, and/or track features of local area 902 (e.g., using depth and/or surface information, as described above) and (2) controller tracking to determine location, orientation, and/or movement of one or more hand-held controllers 1002 used by a user of the head-mounted display system. Imaging device 802 of local area imaging assembly 901, for example, may receive and utilize light emitted by hand-held controller 1002 for tracking location, orientation, and/or movement of hand-held controller 1002 relative to head-mounted display 800 and/or local area 902. Any suitable ranges of light wavelengths may be respectively utilized for SLAM imaging and controller tracking. In at least one embodiment, separate frames (e.g., alternating frames) captured by imaging device 802 may be respectively utilized by local area imaging assembly 901 for SLAM imaging and controller tracking as described herein. For example, one or more frames captured by imaging device 802 during a time period may be utilized for SLAM imaging and one or more frames captured by imaging device 802 during a subsequent time period may be utilized for controller tracking.

In some examples, a local area imaging assembly (e.g., local area imaging assembly 901) with one or more of the features described above may be disposed within an external sensor device for tracking and/or mapping features of local area 902, portions of the head-mounted display system (e.g., head-mounted display 800, hand-held controllers 1002, etc.), and/or one or more users and/or objects within local area 902. In some examples, the external sensor device may be a device that is used to detect the position, orientation, and/or motion of an additional device and/or object in a local area of the external sensor device. In one example, local area imaging assembly 901 may be utilized in an external sensor device that is separate from head-mounted display 800, such as an external sensor bar and/or other suitable external sensor device.

In some examples, the instant disclosure may include a system, such as an artificial reality system, including a local area imaging assembly (e.g., local area imaging assembly 901), which may include an imaging device (e.g., imaging device 802), with at least one of the features discussed above. Also, in some embodiments, the instant disclosure may include a method for manufacturing, assembling, using, and/or otherwise configuring or creating a system with one or more of the features described herein.

As discussed throughout the instant disclosure, the disclosed systems and methods may provide one or more moveable DOEs of a plurality of DOEs employed within a light projector system, such as for a camera or other imaging system. By using one or more actuators to move the one or more movable DOEs about an optical axis of the light projector system over time, high-resolution structured light patterns may be projected into a local area using relatively inexpensive DOEs that each provide a comparatively lower-resolution pattern. Capturing images of reflections from the local area of the high-resolution patterns may thus facilitate correspondingly high-resolution maps of the local area that may quickly adapt to changes in the local area.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a light source;
   a first diffractive optical element (DOE), optically coupled with the light source, that produces a first diffracted light pattern;
   at least one additional DOE, optically coupled with the light source in series with the first DOE, that produces at least one additional diffracted light pattern;
   a first actuator that moves, in response to a first actuator control signal, the first DOE in a first plane perpendicular to an optical axis of the system; and
   a first lens, optically coupled with the first DOE and the at least one additional DOE, that projects structured light onto a local area based on the first diffracted light pattern and the at least one additional diffracted light pattern.

2. The system of claim 1, further comprising:
   a second actuator that moves, in response to a second actuator control signal, one of the at least one additional DOE in a second plane parallel to the first plane.

3. The system of claim 1, wherein the first actuator translates the first DOE along a first axis in the first plane.

4. The system of claim 1, wherein the first actuator translates the first DOE along a first axis in the first plane and along a second axis in the first plane orthogonal to the first axis.

5. The system of claim 1, wherein the first actuator rotates the first DOE in the first plane.

6. The system of claim 5, wherein the first actuator rotates the first DOE about the optical axis defined by the system.

7. The system of claim 1, wherein the first actuator comprises a microelectromechanical system (MEMS) actuator.

8. The system of claim 1, wherein one of the first diffracted light pattern or the at least one additional diffracted light pattern comprises at least one pattern dimension larger than a corresponding pattern dimension of another of the first diffracted light pattern or the at least one additional diffracted light pattern.

9. The system of claim 1, wherein the light source comprises a vertical-cavity surface-emitting laser (VCSEL).

10. The system of claim 1, further comprising:
    a prism optically coupling the light source to the first DOE and the at least one additional DOE.

11. The system of claim 10, wherein the light source comprises an edge-emitting laser (EEL).

12. The system of claim 1, further comprising:
    a second lens optically coupling the light source to the first DOE and the at least one additional DOE.

13. The system of claim 1, further comprising:
    an imaging device that captures, in response to a capture control signal, an image of a reflection of the structured light from the local area.

14. The system of claim 13, further comprising:
    a control system that generates the first actuator control signal and the capture control signal to cause the first actuator to move the first DOE to a first position and to move the first DOE to a second position, and to cause the imaging device to capture a first image of the reflection of the structured light while the first DOE is in the first position and to capture a second image of the reflection of the structured light while the first DOE is in the second position.

15. The system of claim 13, further comprising:
    a control system that generates the first actuator control signal and the capture control signal to cause the first actuator to move the first DOE to a first position and to move the first DOE to a second position, and to cause the imaging device to capture a single image of the reflection of the structured light while the first DOE is in the first position and while the first DOE is in the second position.

16. The system of claim 13, further comprising:
    a control system that generates the first actuator control signal and the capture control signal to cause the first actuator to move the first DOE among a plurality of positions in a repeating pattern, and to cause the imaging device to capture a single image of the reflection of the structured light while the first DOE is moving among the plurality of positions.

17. The system of claim 13, further comprising:
    a second actuator that moves, in response to a second actuator control signal, one of the at least one additional DOE in a second plane perpendicular to the optical axis defined by the system; and
    a control system that generates the first actuator control signal, the second actuator control signal, and the capture control signal to cause the first actuator to move the first DOE among a first plurality of positions in a first repeating pattern, to cause the second actuator to move the one of the at least one additional DOE among a second plurality of positions in a second repeating pattern, and to cause the imaging device to capture a single image of the reflection of the structured light while the first DOE is moving among the first plurality of positions and the one of the at least one additional DOE is moving among the second plurality of positions.

18. A system comprising:

a light source;

a first diffractive optical element (DOE), optically coupled with the light source, that produces a first diffracted light pattern;

at least one additional DOE, optically coupled to the light source in series with the first DOE, that produces at least one additional diffracted light pattern;

an actuator that moves, in response to an actuator control signal, the first DOE in a first plane perpendicular to an optical axis of the system;

a first lens, optically coupled with the first DOE and the at least one additional DOE, that projects structured light onto a local area based on the first diffracted light pattern and the at least one additional diffracted light pattern;

an imaging device that captures, in response to a capture control signal, at least one image of a reflection of the structured light from the local area in response;

a control system that generates the actuator control signal and the capture control signal to generate a map of the local area using the at least one image; and a display system that displays a virtual environment based on the map of the local area.

19. A method comprising:

moving, to a first position in a plane perpendicular to an optical axis using an actuator, a first diffractive optical element (DOE) optically coupled with a light source in series with at least one additional DOE to project a first structured light pattern in a local area;

moving, to a second position in the plane using the actuator, the first DOE to project a second structured light pattern in the local area; and capturing, using an imaging device, a reflection of the first structured light pattern and a reflection of the second structured light pattern from the local area.

20. The method of claim 19, further comprising:

mapping the local area based on the capturing of the reflection of the first structured light pattern and the reflection of the second structured light pattern.

* * * * *